(12) United States Patent
Elger et al.

(10) Patent No.: US 9,475,715 B2
(45) Date of Patent: Oct. 25, 2016

(54) OPTIMIZED PROCESS AND AERATION PERFORMANCE WITH AN ADVANCED CONTROL ALGORITHM

(71) Applicant: Xylem Water Solutions U.S.A., Inc., Brown Deer, WI (US)

(72) Inventors: Sarah Olivia Elger, Cudahy, WI (US); Asa Helena Goransdotter Henriksson, Sollentuna (SE); John Edward Koch, III, Wauwatosa, WI (US)

(73) Assignee: XYLEM WATER SOLUTIONS U.S.A., INC., Brown Deer, WI (US)

( * ) Notice: Subject to any disclaimer, the term of this patent is extended or adjusted under 35 U.S.C. 154(b) by 122 days.

(21) Appl. No.: 14/081,718

(22) Filed: Nov. 15, 2013

(65) Prior Publication Data

US 2014/0138308 A1  May 22, 2014

Related U.S. Application Data

(60) Provisional application No. 61/727,517, filed on Nov. 16, 2012.

(51) Int. Cl.
*C02F 3/30* (2006.01)
*C02F 3/00* (2006.01)

(52) U.S. Cl.
CPC ............ *C02F 3/308* (2013.01); *C02F 3/006* (2013.01); *C02F 3/302* (2013.01); *C02F 2209/005* (2013.01); *C02F 2209/02* (2013.01); *C02F 2209/04* (2013.01); *C02F 2209/08* (2013.01); *C02F 2209/10* (2013.01); *C02F 2209/14* (2013.01); *C02F 2209/15* (2013.01);
(Continued)

(58) Field of Classification Search
CPC ........ C02F 3/308; C02F 3/006; C02F 3/302; C02F 2209/005; C02F 2209/02; C02F 2209/04; C02F 2209/08; C02F 2209/10; C02F 2209/14; C02F 2209/15; C02F 2209/18; C02F 2209/22; C02F 2209/44; Y02W 10/12; Y02W 10/15
USPC ....... 210/605, 614, 620, 630, 138, 143, 220, 210/221.2, 259, 260, 903, 906
See application file for complete search history.

(56) References Cited

U.S. PATENT DOCUMENTS 5,582,734 A    12/1996 Coleman et al.
5,989,428 A *  11/1999 Goronszy ................. 210/605
(Continued)

FOREIGN PATENT DOCUMENTS

CN    101792208 A    8/2010
JP    2001121187 A   5/2001
WO   2008155510 A1  12/2008

OTHER PUBLICATIONS

Office Action/Search Report for related Application No. 201380067073.6, dated Jun. 1, 2016.

*Primary Examiner* — Fred Prince
(74) *Attorney, Agent, or Firm* — The Webb Law Firm (57) ABSTRACT

An automatically controlled wastewater treatment process can include automatically controlling nitrification and denitrification capacity in a water source. The nitrification and denitrification capacity can be automatically controlled simultaneously. In addition, the wastewater treatment process can also include automatically controlling solids retention time (SRT) and biological phosphorus removal in a water source as well as automatically controlling the removal of water from a containment device.

25 Claims, 8 Drawing Sheets

(52) U.S. Cl.
CPC ........ *C02F2209/18* (2013.01); *C02F 2209/22* (2013.01); *C02F 2209/44* (2013.01); *Y02W 10/12* (2015.05); *Y02W 10/15* (2015.05)

(56) References Cited

U.S. PATENT DOCUMENTS

| | | | |
|---|---|---|---|
| 6,254,778 B1 | 7/2001 | Chudoba et al. | |
| 6,312,600 B1 | 11/2001 | Audic et al. | |
| 6,328,881 B1 * | 12/2001 | Larkner et al. | 210/87 |
| 6,569,335 B1 | 5/2003 | Johnson | |
| 6,706,171 B2 | 3/2004 | Lee et al. | |
| 6,808,630 B2 | 10/2004 | Yang | |
| 7,153,429 B1 | 12/2006 | Pedros | |
| 7,156,998 B2 | 1/2007 | Reid | |
| 7,332,093 B2 | 2/2008 | Rosen et al. | |
| 7,335,305 B2 | 2/2008 | Cheuk et al. | |
| 7,413,654 B2 | 8/2008 | Applegate et al. | |
| 7,416,669 B1 | 8/2008 | Carolan et al. | |
| 7,431,840 B2 | 10/2008 | Janssen et al. | |
| 7,449,113 B2 | 11/2008 | Jenkins et al. | |
| 7,563,363 B2 | 7/2009 | Kuzma | |
| 7,645,385 B2 | 1/2010 | Martin et al. | |
| 7,655,142 B2 | 2/2010 | Liu et al. | |
| 7,662,287 B2 | 2/2010 | Janssen et al. | |
| 7,718,066 B2 | 5/2010 | Jenkins et al. | |
| 8,025,796 B2 | 9/2011 | Janssen et al. | |
| 8,110,109 B2 | 2/2012 | Lemoine et al. | |
| 8,308,947 B2 | 11/2012 | Lee et al. | |
| 8,323,498 B2 | 12/2012 | Jenkins et al. | |
| 2002/0043486 A1 | 4/2002 | Lee et al. | |
| 2003/0015469 A1 | 1/2003 | Hedenland et al. | |
| 2006/0108292 A1 | 5/2006 | Ishikawa et al. | |
| 2006/0113243 A1 | 6/2006 | Applegate et al. | |
| 2007/0108125 A1 | 5/2007 | Cho et al. | |
| 2010/0096339 A1 | 4/2010 | Newcombe et al. | |
| 2011/0084416 A1 | 4/2011 | Locklair et al. | |
| 2012/0187048 A1 | 7/2012 | Jenkins et al. | |
| 2012/0312745 A1 | 12/2012 | Locklair et al. | |
| 2013/0009961 A1 | 1/2013 | Reid et al. | |

* cited by examiner

OPTIMIZED PROCESS AND AERATION PERFORMANCE WITH AN ADVANCED CONTROL ALGORITHM

CROSS REFERENCE TO RELATED APPLICATIONS

This application claims the benefit of U.S. Provisional Application No. 61/727,517, filed Nov. 16, 2012, which is hereby incorporated in its entirety by reference.

BACKGROUND OF THE INVENTION

1. Field of the Invention

The present invention relates to a wastewater treatment process, and in particular, to an automatically controlled wastewater treatment process.

2. Description of Related Art

Current wastewater treatment batch processes use a time activated system that introduces influent wastewater into a containment device and then treats the wastewater under various conditions. The treatment phase is often referred to as the reaction phase where aerobic, anoxic, and/or anaerobic conditions are used to treat influent wastewater. Under aerobic conditions, dissolved oxygen is introduced into the containment device and mixed with the influent wastewater and various microorganisms. The aerobic conditions convert ammonium and organic nitrogen found in the wastewater to nitrate. This is commonly referred to as nitrification. As used herein, ammonium ($NH_4$) is used to describe ammonia ($NH_3$), ammonia as nitrogen ($NH_3$—N), and ammonium as nitrogen ($NH_4$—N). Some treatment processes also use anoxic conditions to convert the nitrate to nitrogen gas, which is referred to as denitrification. Denitrification of the wastewater is achieved by mixing nitrate and microorganisms in the absence of dissolved oxygen.

Further, when phosphorous is present in the wastewater, the phosphorous is removed using anaerobic conditions followed by subsequent aerobic conditions. During an anaerobic process, wastewater and microorganisms are mixed together in the absence of both dissolved and chemically bound oxygen. Phosphorus is released by the microorganisms under anaerobic conditions and subsequently taken back up by the microorganisms in excess of what the microorganisms would normally take up without being introduced to anaerobic conditions.

The reaction phase is controlled by a logic program that uses periods of time inputted by an operator to promote the aerobic, anoxic, and anaerobic conditions. For example, in order to control the aerobic conditions during the reaction phase, the speed setpoint of an aeration system is controlled based on readings from dissolved oxygen (DO) instruments and an operator inputted DO setpoint.

As can be seen from the steps described above, one drawback to the current treatment processes is the need to manually input information in the system. The process of manually inputting information into a control unit to determine and adjust the DO setpoint and the amount of aerobic, anoxic, and anaerobic time required for each treatment cycle is inefficient and burdensome. A need therefore exists for a system that can automatically adjust the parameters of a wastewater treatment process in order to optimize the effluent water quality of each treatment cycle and to minimize the energy used through the entire treatment process.

SUMMARY OF THE INVENTION

In one embodiment according to the present invention, a method for automatically controlling nitrification capacity in a water source includes: measuring nitrogen and temperature in a water source; determining at the start of a treatment cycle for the water source an amount of nitrogen to be nitrified during the treatment cycle; calculating a dissolved oxygen setpoint, a time period of an aerobic treatment phase, or a combination thereof from the amount of nitrogen to be nitrified; and dissolving oxygen into the water source. The amount and duration of oxygen dissolved into the water source is automatically controlled by a control unit based on the calculated dissolved oxygen set point, the time period of an aerobic treatment phase, or a combination thereof.

In certain embodiments, the present invention is directed to a method for automatically controlling denitrification capacity in a water source. The method includes: measuring nitrogen and temperature in a water source; determining at the start of a treatment cycle for the water source an amount of nitrogen to be denitrified during the treatment cycle; calculating a time period of an anoxic treatment phase for denitrification; and terminating an oxygen supply to the water source. The duration of the termination of the oxygen supply is automatically controlled by a control unit based on the calculated time period for the anoxic treatment phase.

In certain embodiments, the present invention is directed to a method for automatically controlling solids retention time (SRT) in a water source. The method includes: measuring total suspended solids, ammonium, nitrate, temperature, or a combination thereof in a water source; determining an amount of biomass wasted; calculating a nitrifier growth rate for the water source; calculating a target SRT for the water source using the nitrifier growth rate; and calculating a target amount of biomass to be wasted. The target amount of biomass to be wasted is automatically controlled by a control unit based on modifying a duration of wasting, a flow rate of wasting or a combination thereof.

In certain embodiments, the present invention is directed to a method for automatically controlling the removal of water from a containment device, the method comprising: measuring water level, water flow, sludge blanket height, or a combination thereof in a water source within a containment device; determining at the start of a decant phase of a treatment cycle for the water source a hydraulic performance of a previous treatment cycle, the current treatment cycle, a predicted treatment cycle, or a combination thereof; calculating a volume of water to be removed from the containment device for a given treatment cycle using the hydraulic performance of previous treatment cycles, the current treatment cycle, the predicted treatment cycle, or a combination thereof; and terminating the removal of water from the containment device once the calculated volume of water to be removed from the containment device for a given treatment cycle has been achieved. The volume of water removed from the containment device is automatically controlled by a control unit by monitoring a water level in the containment device or a water flow rate of the effluent B from the containment device.

In certain embodiments, the present invention is directed to a method for automatically controlling biological phosphorus removal in a water source. The method includes: measuring a parameter selected from nitrate, phosphorus or a combination thereof in a water source; determining a length of an anaerobic phase of a treatment cycle based on the parameters measured in the water source; restricting an oxygen supply to the water source, wherein the duration of the restriction of oxygen supply is automatically controlled by a control unit based on the parameters measured in the water source or a predetermined time period; and dissolving oxygen in the water source after the time period for the restriction of oxygen is determined to be completed.

In certain embodiments, the present invention is directed to a method for automatically controlling simultaneous nitrification and denitrification in a water source. The method includes: measuring ammonium and nitrate in a water source; calculating a first order derivative based on the measured ammonium and nitrate in the water source; calculating a second order derivative based on the measured ammonium and nitrate in the water source; and using the first order derivative, second order derivative, or combination thereof to enable and disable a supply of oxygen to the water source. The oxygen supply is automatically controlled by a control unit.

DETAILED DESCRIPTION OF DETAILED EMBODIMENTS

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Moreover, other than in any operating examples, or where otherwise indicated, all numbers expressing, for example, quantities used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1:
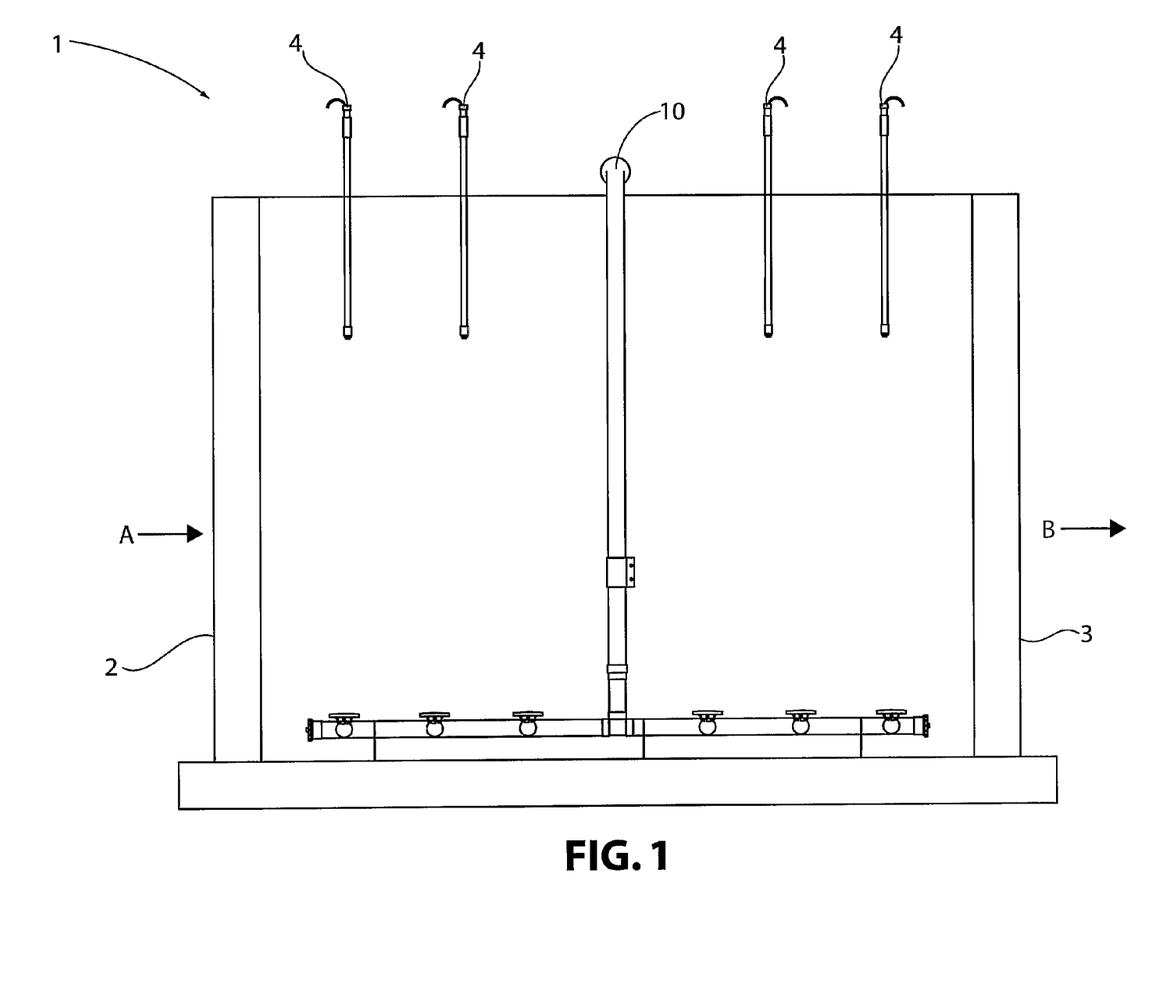
FIG. 1 is a side view of a containment device for treating wastewater in accordance with an embodiment of the present invention.

As indicated above, the present invention relates to a wastewater treatment process. The wastewater treatment processes can be used with any water source. As used herein, "water source" includes, but is not limited to, influent wastewater, the wastewater in the containment device and/or the effluent wastewater. In certain embodiments, as shown in FIG. 1, the process involves the use of a containment device 1 having a first end 2 where influent wastewater enters the containment device 1 and a second end 3 where effluent water exits the containment device 1. The flow of influent water into the first end 2 of the containment device 1 is illustrated as reference letter A in FIG. 1 and the flow of effluent water out of the second end 3 of the containment device 1 is illustrated as reference letter B in FIG. 1.

Figure 2:
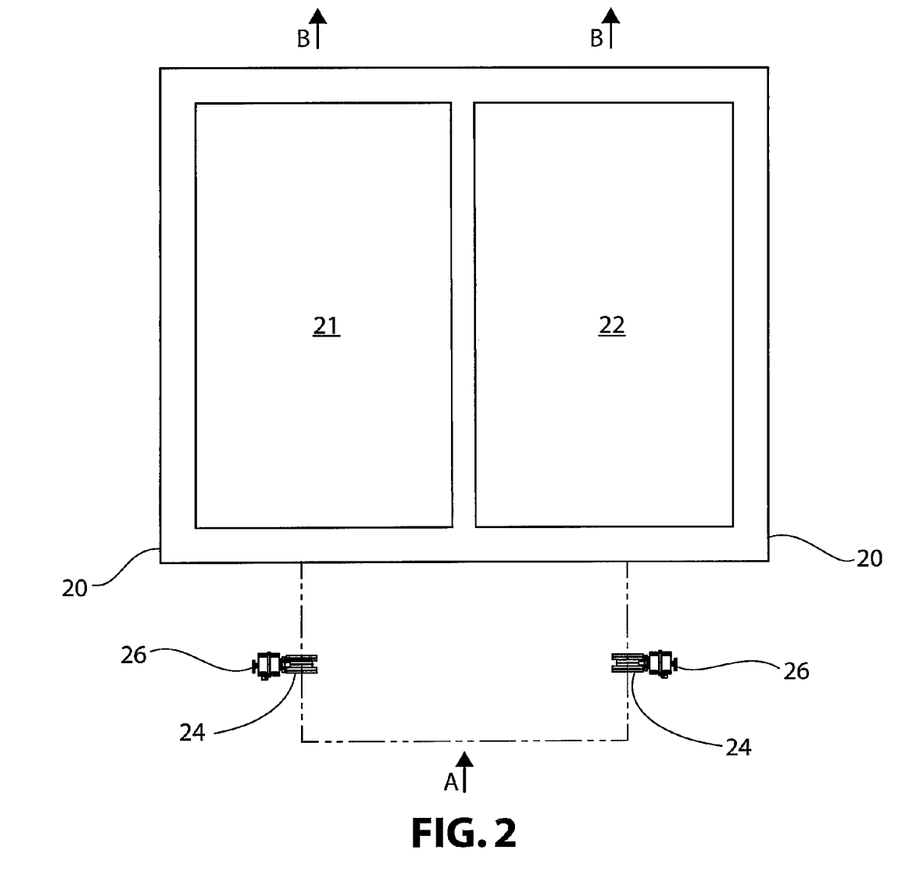
FIG. 2 is a top view of multiple containment devices for treating wastewater in accordance with an embodiment of the present invention.

In one embodiment, the containment device 1 is a batch reactor. However, other containment devices 1 can be used with the present invention. Non-limiting examples of containment devices 1 that are suitable for use with the present invention include various types of basins, tanks, and vessels. The present invention can use a single containment device 1 as shown in FIG. 1 or a multiple containment device system 20 having at least a first containment device 21 and a second containment device 22 as shown in FIG. 2. The multiple containment device system 20 can utilize as many containment devices as necessary. Referring to FIG. 2, a plurality of valves 24 and control units 26 can be used to introduce influent wastewater into the containment devices 21, 22 of the multiple containment device system 20 at intermittent intervals.

Referring again to FIG. 1, the containment device 1 can include an aeration system 10. The aeration system 10 delivers air to the containment device 1. The air delivered from the aeration system 10 circulates through and mixes with the influent wastewater and microorganisms located in the containment device 1. Various aeration systems 10 can be used with the present invention. For instance, the aeration system 10 can include blowers, air valves (automated, modulating and/or manual), an air piping arrangement, and diffusers submerged within and positioned near the bottom of the containment device 1. Non-limiting examples of blowers that are suitable for use with the present invention include positive displacement blowers, rotary screw blowers, high speed turbo blowers, and centrifugal blowers. Non-limiting examples of diffusers that are suitable for use with the present invention include membrane diffusers such as fine bubble diffusers and coarse bubble diffusers. Other non-limiting examples of aeration systems 10 suitable for use with the present invention utilize jet aerators, aspirators, and various mechanical aerators. The proximity of the aeration system 10 within the containment device 1 will depend on the type aeration system 10 used with the present invention.

The containment device 1 can further include instruments 4 (see FIG. 1) that can analyze, detect, and monitor various conditions and environments of a water source. Non-limiting examples of instruments 4 that can be used with the present invention include those that use a probe inserted into a containment device to measure a parameter and those that pull a sample from the containment device to measure a parameter of one or more of the following parameters: dissolved oxygen (DO), ammonium ($NH_4$), chemical oxygen demand (COD), oxidation reduction potential (ORP), total suspended solids (TSS), nitrate ($NO_3$), nitrite ($NO_2$), total nitrogen (TN), orthophosphate ($PO_4$), total phosphorus (TP), temperature, water level, sludge blanket and pH. Various types of instruments 4 including the ones described above can be used together, individually, or in different combinations in a single containment device 1 or in a multiple containment device system 20. In addition, certain instruments 4 can be used to measure more than one parameter. For example, a single instrument 4 can measure both $NH_4$ and $NO_3$. In certain embodiments, a single containment device system 1 contains several instruments 4 of the same type. For example, a single containment device 1 can have more than one DO instrument.

Figure 3:
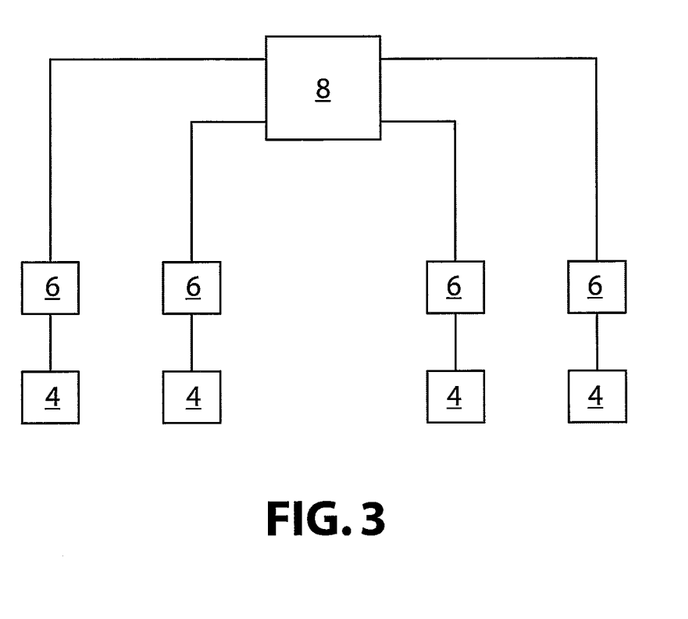
FIG. 3 is schematic diagram depicting the monitoring and transfer of data in accordance with an embodiment of the present invention.
Figure 4:
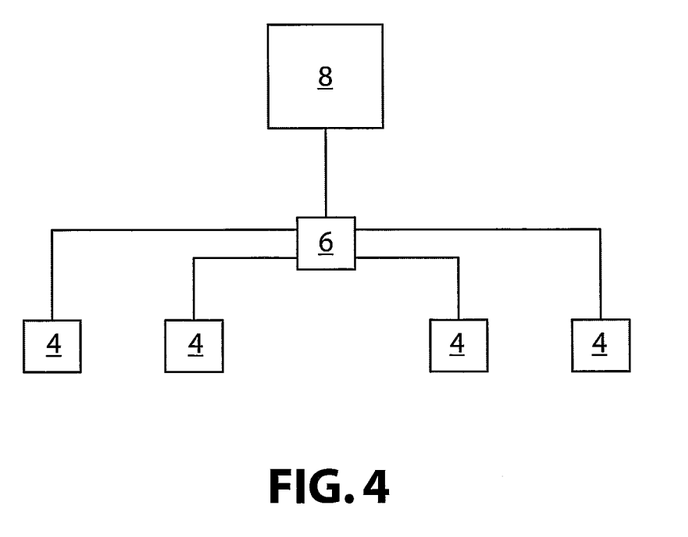
FIG. 4 is schematic diagram depicting the monitoring and transfer of data in accordance with another embodiment of the present invention.

As shown in FIG. 3, each instrument 4 can be connected to a different terminal 6 that can interpret and format the data and information detected and collected by the instruments 4. Accordingly, in one embodiment, a DO instrument is connected to and in communication with a DO terminal, and an ORP instrument is connected to and in communication with an ORP terminal. Alternatively, and as shown in FIG. 4, the instruments 4 can be connected to a single terminal 6. The instruments 4 can also be connected to a network of terminals 6. The instruments 4 can be connected to the terminals 6 with the use of wires. In another embodiment, the instruments 4 are connected to the terminals 6 by a wireless connection. In certain embodiments, the instruments 4 directly communicate and transmit data and information to the terminal 6. Alternatively, the instruments 4 can communicate and transmit data and information indirectly to the terminals 6. As used herein, "indirect communication" refers to the transfer of data and information from one device to another with the use of an intermediate component.

After data collected by the instruments 4 are formatted by the terminals 6, the formatted information is transferred to and computed by a control unit 8. In one embodiment, the control unit 8 is a programmable logic controller (PLC). Other non-limiting examples of control units 8 that are suitable for use with the present invention include microprocessors and computers. The control unit 8 can be programmed to control the treatment process based on the data and information collected by the instruments 4 and formatted by the terminals 6. For example, the control unit 8 can use logic to automatically control the duration of the reaction phase of the wastewater treatment process of the present invention, which is described in detail below.

In one embodiment according to the present invention, the nitrification capacity of the activated sludge process is automatically controlled by adjusting the DO setpoint based on identifying the amount of nitrogen to be nitrified during a given treatment cycle. The amount of nitrogen to be nitrified during a given treatment cycle is identified at the start of the cycle, after the contents of the containment device 1 are completely mixed. In certain embodiments, ammonium ($NH_4$) instruments 4 located in the containment device 1, in the effluent wastewater stream B and/or in the influent wastewater stream A can be used to measure the amount of nitrogen and the temperature in the water source. The amount of nitrogen measured in the water source is compared with an inputted target nitrogen setpoint to predict and identify the amount of nitrogen to be nitrified over the treatment cycle. The target nitrogen setpoint is the nitrogen level that is desired and inputted by a user. COD instruments can be used to predict the organic material available and TSS instruments can be used to identify the biomass present in the containment device 1. Additional instruments including, but not limited to, ORP, $NO_3$, $NO_2$, water level, pH, and temperature instruments may be used individually or in combination to modify or further monitor other process parameters.

Based on the initial amount of nitrogen that needs to be nitrified and the nitrifying mass or concentration available, a nitrification kinetic equation can be used to calculate a target DO setpoint to be maintained by the control system, such as a control unit 8, to convert ammonium and organic nitrogen to nitrate. The DO concentration can be determined by establishing the relationship between DO and nitrification rate. As used herein, "nitrification rate" refers to rate at which ammonium and organic nitrogen are converted to nitrate. One example of how a nitrification kinetic equation can be used to calculate a target DO setpoint is shown below:

$$DO = \frac{(K_O)(NR_x)[NH_4 + K_N]}{(NR_{MAX})(NH_4) - (NR_X)[NH_4 + K_N]}$$

which is derived from the nitrification kinetics equation:

$$NR_X = NR_{MAX}\left[\frac{DO}{DO + K_O}\right]\left[\frac{NH_4}{NH_4 + K_N}\right]$$

where $NR_x$=nitrification rate, $NR_{MAX}$=maximum nitrification rate, DO=dissolved oxygen concentration, $K_O$=half saturation constant for dissolved oxygen, $NH_4$=effluent ammonium concentration, and $K_N$=half saturation constant for nitrifiers. The nitrification rate for the water source can be determined by the following equation:

$$NR_x = \frac{N_{NIT}}{MLSS \times AT}$$

where $NR_x$=nitrification rate, $N_{NIT}$=amount of nitrogen to be nitrified, MLSS=amount of biomass in containment device 1, and AT=aerobic time. The aerobic time can be determined by using DO readings received from the DO instrument 4 in the containment device 1. The nitrification rate and the maximum nitrification rate can also be determined from previously conducted water treatment cycles, from the current water treatment cycle, and/or from an established nitrification rate. As used herein, an "established nitrification rate" is one that can be readily found in literature or calculated from other water sources. In the event it is determined that the target nitrogen setpoint will not be reached, the system will use real-time data from the instruments to adjust or correct the control algorithm during the reaction phase.

Figure 5:
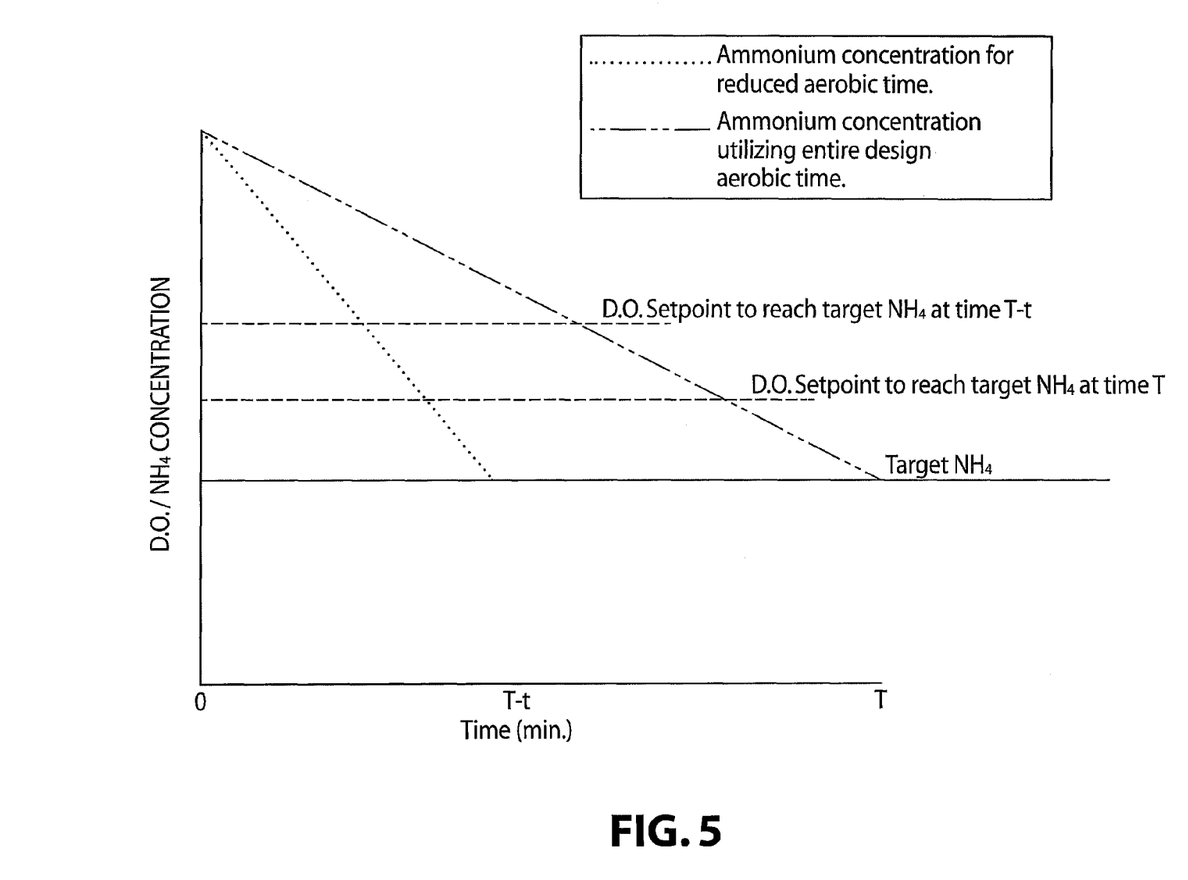
FIG. 5 is a graph depicting the impact of the nitrification rate and DO setpoint in relation to the required aerobic time in accordance with multiple embodiments of the present invention.

In another embodiment according to the present invention, the nitrification capacity of the activated sludge process can also be controlled by adjusting the aerobic time within the treatment cycle based on the amount of nitrogen to be nitrified during a given treatment cycle and a nitrification rate where the nitrification rate can be determined from previously conducted water treatment cycles, from the current water treatment cycle and/or from an established nitrification rate. The length of aerobic time for a given cycle can be determined by using a specific nitrification rate for the treatment cycle and the amount of nitrogen to be nitrified during the treatment cycle. The amount of nitrogen to be treated during a given treatment cycle is identified at the start of the cycle, after the contents of the containment device 1 are completely mixed. To stabilize the specific nitrification rate, DO instruments are used with the control unit 8 to keep the DO concentration in the containment device 1 as close to a DO setpoint (calculated by the logic or inputted by a user) as possible. Ammonium and/or $NO_3$ instruments are used to determine the change in $NH_4$ and $NO_3$ concentration. The change in $NH_4$ and/or $NO_3$ concentration in combination with the TSS instruments can be used to calculate a specific nitrification rate for all or for portions of the reaction phase of the treatment cycle. The $NH_4$ and/or $NO_3$ instruments are also used for continuous feedback of real-time $NH_4$ and/or $NO_3$ concentrations in the containment device 1. Additional instruments including, but not limited to, COD, ORP, water level, pH, and temperature instruments may be used individually or in combination to modify or further monitor other process parameters. FIG. 5 shows how an example dissolved oxygen setpoint can result in achieving the target effluent ammonium over the entire aerobic time period, while another dissolved oxygen setpoint can result in achieving the target effluent ammonium over a shorter aerobic time period.

Based on the amount of nitrogen that needs to be nitrified and the nitrifying mass available, a nitrification kinetic equation can be used to calculate the total time required for the aerobic treatment process per cycle. The nitrification kinetic equation that can be used to calculate the total treatment time required for the aerobic treatment process per cycle is shown below:

$$AT = \frac{N_{NIT}}{MLSS \times NR_X}$$

where $NR_x$=nitrification rate, $N_{NIT}$=amount of nitrogen to be nitrified, MLSS=amount of biomass in containment device 1, and AT=aerobic time per cycle. In the event that it is determined the target nitrogen setpoint will not be reached, the system will use real-time data from the instruments to adjust or correct the control algorithm during the reaction phase.

By using either of the processes described above to automatically control the nitrification capacity of the activated sludge process, the energy consumption of the system is reduced by selecting the minimum DO setpoint for operating the process and/or minimizing the aeration time within each treatment cycle. Controlling and supplying oxygen in this fashion not only minimizes excessive supply of oxygen, but it also supplies oxygen in a low DO environment which enhances oxygen transfer efficiency.

In yet another embodiment of the present invention, the denitrification capacity of the activated sludge process is automatically controlled by adjusting the time period of an anoxic treatment phase by identifying the amount of nitrogen to be denitrified during a given treatment cycle. The amount of nitrogen to be denitrified during a given treatment cycle is identified at the start of the cycle, after the contents of the containment device 1 are completely mixed. Instruments 4 located in the containment device 1, in the effluent wastewater stream B and/or in the influent wastewater stream A can be used to measure the amount of nitrogen and the temperature in the wastewater. The amount of nitrogen to be nitrified is compared to an inputted target nitrogen setpoint to predict the amount of nitrogen to be denitrified over the treatment cycle. COD instruments can be used to determine the organic material available and TSS instruments can be used to identify the biomass present in the containment device 1. Additional instruments including, but not limited to, ORP, $NO_3$, $NO_2$, $NH_4$, water level, pH, and temperature instruments may be used individually or in combination to modify or further monitor other process parameters. Based on the initial amount of nitrogen that needs to be denitrified and the denitrifying mass available, a denitrification equation can be used to calculate the total anoxic time per cycle. For example, the total anoxic time per cycle can be calculated with the following equation:

$$A_X T = \frac{N_{DENIT}}{MLSS \times DNR_X}$$

where $DNR_x$=denitrification rate, $N_{DENIT}$=amount of nitrogen to be denitrified, MLSS=amount of biomass in containment device 1, and $A_X T$=anoxic time per cycle.

The denitrification capacity is manipulated by defining anoxic time periods when aeration has been terminated. In one embodiment of present invention, the water source is then mixed. The duration of the anoxic time of the reaction phase is a function of the denitrification rate. As used herein, "denitrification rate" refers to the rate at which nitrate is converted to nitrogen gas. The denitrification rate can be determined by using the change in $NH_4$ and/or $NO_3$ concentrations that are measured by $NH_4$ and $NO_3$ instruments 4, and measuring the reactor biomass with a TSS instrument over a defined anoxic time. The denitrification rate can be determined from previously conducted water treatment cycles, from the current water treatment cycle, and/or from an established denitrification rate. As used herein, an established denitrification rate is one that can be readily found in literature or calculated from other water sources. The denitrification rate can be determined by the following equation:

$$DNR_x = \frac{N_{DENIT}}{MLSS \times A_x T}$$

where $DNR_x$=denitrification rate, $N_{DENIT}$=amount of nitrogen to be denitrified, MLSS=amount of biomass in containment device 1, and $A_X T$=anoxic time. The anoxic time can be determined by using DO and/or ORP readings received from the DO and ORP instruments 4 in the containment device 1. For periods when the denitrification capacity of the system exceeds the set requirements, the mixers in the containment device 1 can be shut off to reduce the amount of energy used. Water level, pH, and temperature instruments can also be used individually or in combination to modify and/or monitor other parameters of the treatment process. Similar to the previous embodiments, in the event it is determined that the target nitrogen setpoint will not be reached, the system will use real-time data from the instruments to adjust or correct the control algorithm during the reaction phase.

Figure 6A:
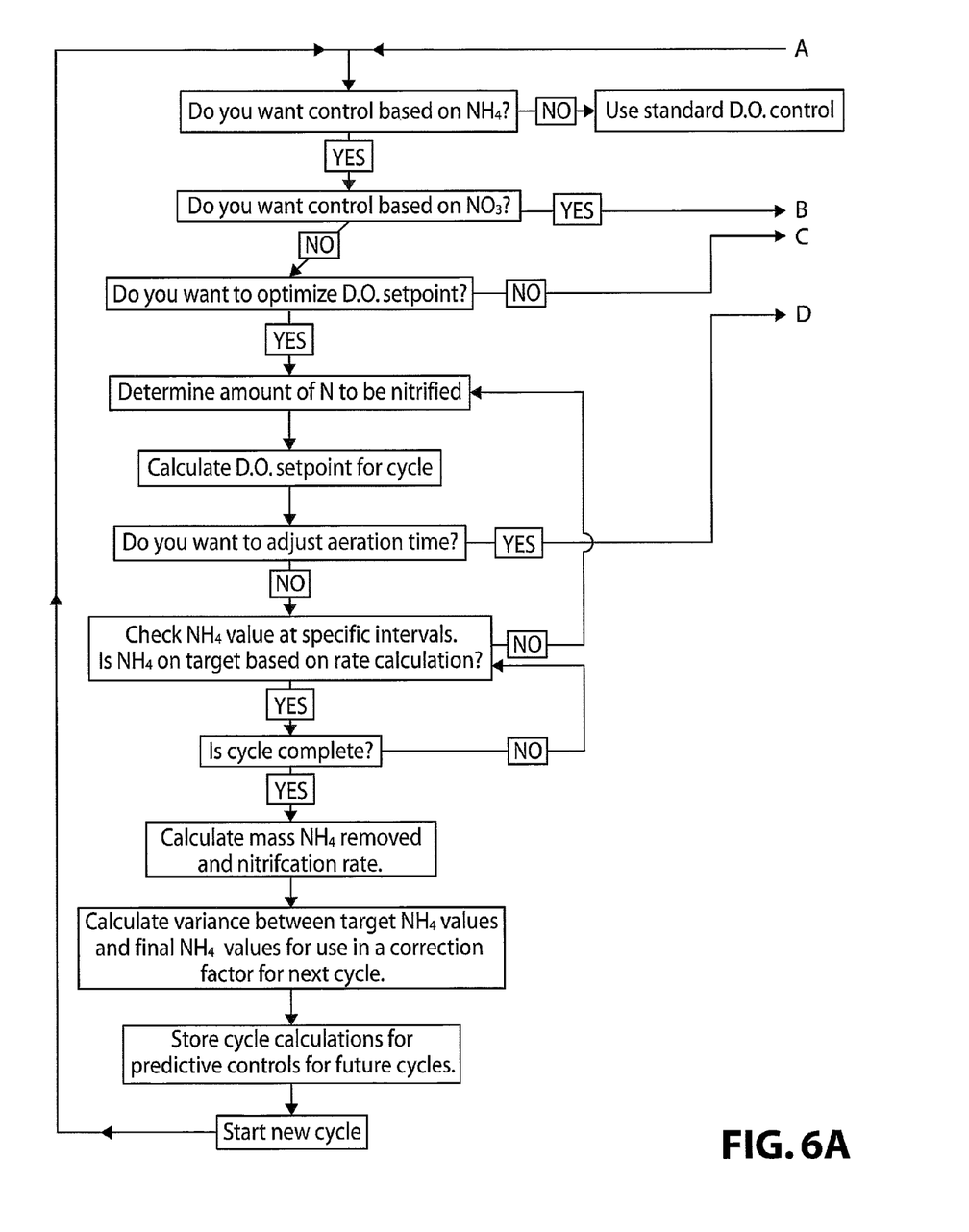
FIG. 6A is a flowchart that illustrates a portion of the logic of one embodiment of the present invention.
Figure 6B:
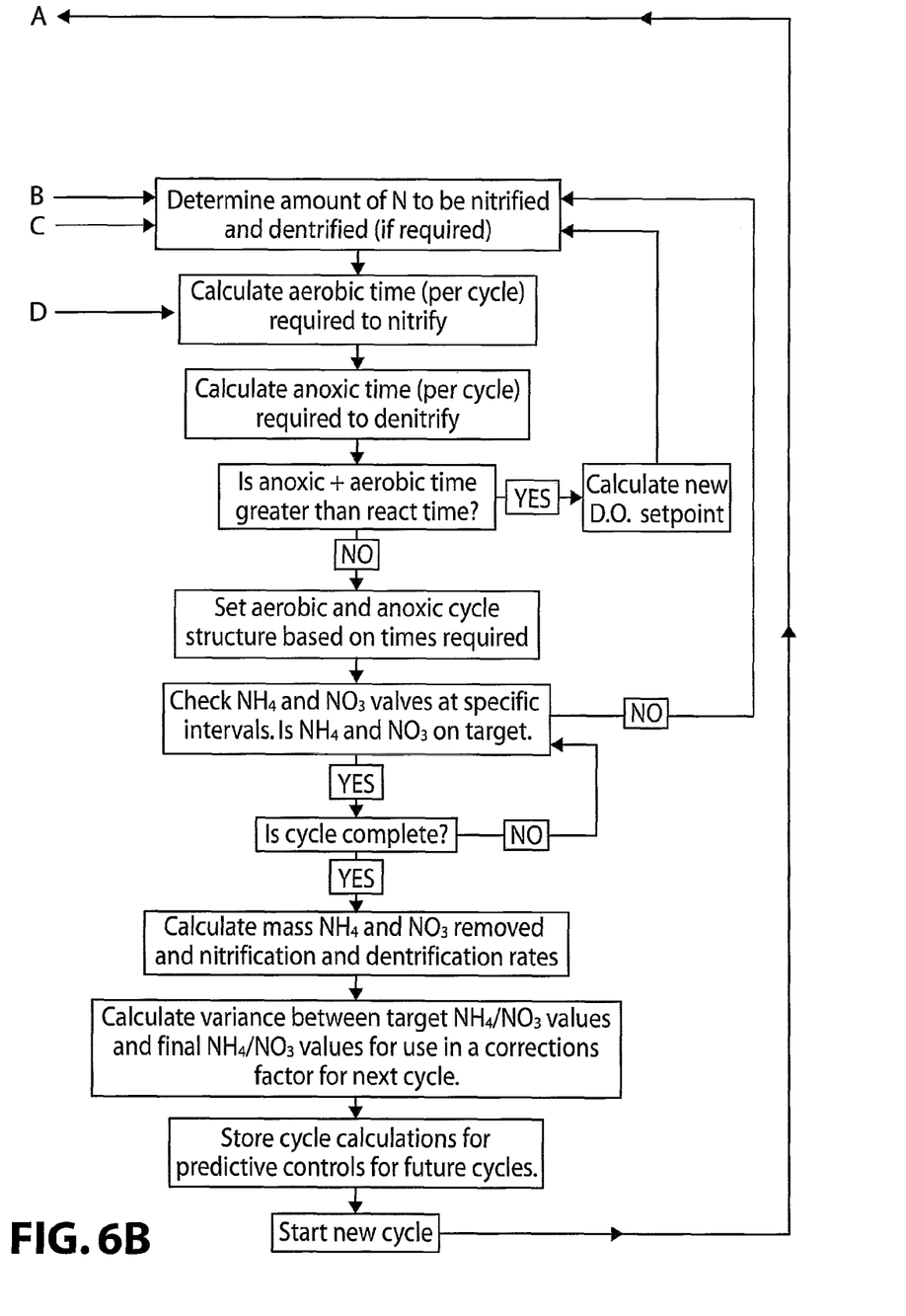
FIG. 6B is a flowchart that illustrates the second portion of the logic in FIG. 6A.

FIGS. 6A and 6B shows the logic used to complete nitrification and denitrification steps in accordance with one or more of the embodiments of the present invention and as described in detail above. It is noted that a portion of the logic is shown in FIG. 6A and the rest of the logic is continued in FIG. 6B As shown in FIG. 6, after the reaction phase is completed, a series of calculations are performed to check nitrification and/or denitrification capacity and compare it against expected results. The control logic for the next cycle is adjusted to compensate for nitrification discrepancies and to optimize the effluent quality.

In addition to automatically controlling nitrification and denitrification, the present invention is also directed to a process of automatically controlling biological phosphorous removal in a water source. The process can be controlled by using phosphorus, $NO_3$ or a combination thereof, instruments 4 to determine the length of the anaerobic phase of the treatment cycle. The process utilizes the beginning of the reaction period for biological phosphorus removal by restricting the oxygen supply to the water source, and the phosphorus, $NO_3$, or combination thereof instruments 4 are used to confirm an anaerobic environment. The length of the anaerobic phase of a treatment cycle can be determined by using a rate of change in the amount of phosphorus in the water source. Once the rate of change decreases from the stable value, the restriction of oxygen is suspended. The length of the anaerobic phase of a treatment cycle can also be determined by using an inputted target phosphorus setpoint, and once the setpoint is achieved, the restriction of oxygen is suspended. The target phosphorous setpoint is the phosphorous level that is desired and inputted by a user. The length of the anaerobic phase of a treatment cycle can also be determined by using an inputted target nitrate setpoint and an inputted anaerobic time period setpoint, and once the amount of nitrate in the water source falls below the nitrate setpoint for inputted anaerobic time period setpoint, the restriction of oxygen is suspended. The target nitrate setpoint is the nitrate level that is desired and inputted by a user. The anaerobic time period setpoint is the length of time the oxygen is restricted after reaching the target nitrate setpoint, as inputted by the user. The length of the anaerobic phase of the treatment cycle may also be selected from a user inputted minimum and maximum time period setpoint, independent of the amount of nitrate in the water source. Further, the methods of determining the length of the anaerobic phase of treatment may be combined and used together for control. Once the duration of the absence of oxygen supply is determined based on the parameters in the water source or a predetermined time period, air is provided to the system to create an aerobic phase of the treatment cycle.

Aerobic periods that follow anaerobic periods encourage luxury or excess phosphorus uptake. The ORP, DO, phosphorus and/or $NO_3$ instruments are monitored during all periods of the reaction phase after the initial anaerobic phase to ensure the system does not reach an anaerobic state subsequent to the luxury or excess phosphorus uptake. If the instruments indicate an anaerobic environment in the containment device 1, the aeration system 10 can be turned on to transform the containment device 1 to an anoxic or aerobic environment.

In another embodiment according to the present invention, the solids retention time (SRT) of the activated sludge process can also be controlled by measuring total suspended solids, $NH_4$, $NO_3$ and/or temperature in a water source and automatically adjusting the biomass wasted. The amount of biomass wasted is based on the calculated target SRT for the water source. A nitrifier growth rate can be calculated and used to determine the aerobic SRT required for the system. The aerobic SRT and the aerobic time per day can be used to calculate the total SRT required for the system. The total SRT is the average time a particle of suspended solids remains in a wastewater treatment system. Further, as used herein, the term "nitrifier growth rate" refers to rate at which nitrogen consuming microorganisms grow in an environment.

In certain embodiments, the nitrifier growth rate for the water source can be calculated from a nitrification rate, a nitrifier yield coefficient, the biomass in the water source, the temperature of the water source, or a combination thereof. The nitrification rate can be determined from previously conducted water treatment cycles, from the current water treatment cycle, from an established nitrification rate, or a combination thereof. Further, as used herein, the term "nitrifier yield coefficient" refers to the amount of nitrifying biomass produced per amount of nitrogen oxidized. The nitrifier yield coefficient can be selected based on an established value, where in an established value is one that can be readily found in literature or calculated from other water sources.

In certain embodiments, TSS instruments positioned in the containment device 1 can be used in combination with waste activated sludge (WAS) TSS instruments and a WAS flow meter or indicator to identify the biomass in the containment device and the biomass wasted per cycle (and day). Water level, pH, temperature, $NH_4$, $NO_3$, $NO_2$, DO, and ORP instruments can also be used, either individually or in combination, to modify and monitor other parameters.

A control algorithm can be used with the data calculated from the instruments to automatically adjust the wasting time per day to stabilize the biomass at the sludge age derived from the nitrifier growth rate for the system. The control algorithm includes a target total SRT calculation as shown below:

$$SRT = \frac{SRT_A}{AT_D},$$

where $SRT_A = \frac{SF}{GR_N}$, where $GR_N = NR_X \times Y_N$, where $GR_N$=nitrifier growth rate, $NR_x$=nitrification rate, $Y_N$=nitrifier yield coefficient, $SRT_A$=aerobic sludge retention time, SF=safety factor, $AT_D$=aeration time per day, and SRT=target total sludge retention time. As used herein, the term safety factor refers to a multiplier that makes allowances for wastewater variations.

The control algorithm also includes a current sludge retention time calculation as shown below:

$$SRT_{CUR} = \frac{Mass_{MLSS}}{Mass_{WAS}}$$

where $SRT_{CUR}$=current sludge retention time, $Mass_{MLSS}$=mass of the biomass in containment device 1, and $Mass_{WAS}$=mass of the waste activated sludge per day.

In certain embodiments, the amount of biomass wasted is adjusted based on the difference between the target SRT for the water source and the current biomass for the water source. The amount of biomass wasted is adjusted by modifying the duration of time of the wasting period and/or the flow rate at which the biomass is wasted. An example of how the duration of time of the wasting period can be adjusted is by increasing the run time of a pump that is wasting the biomass. An example of how the flow rate at which the biomass is wasted can be adjusted is by varying the speed of the pump that is wasting the biomass. Another mechanism that can be used to control the biomass wasted is a control valve.

Figure 8:
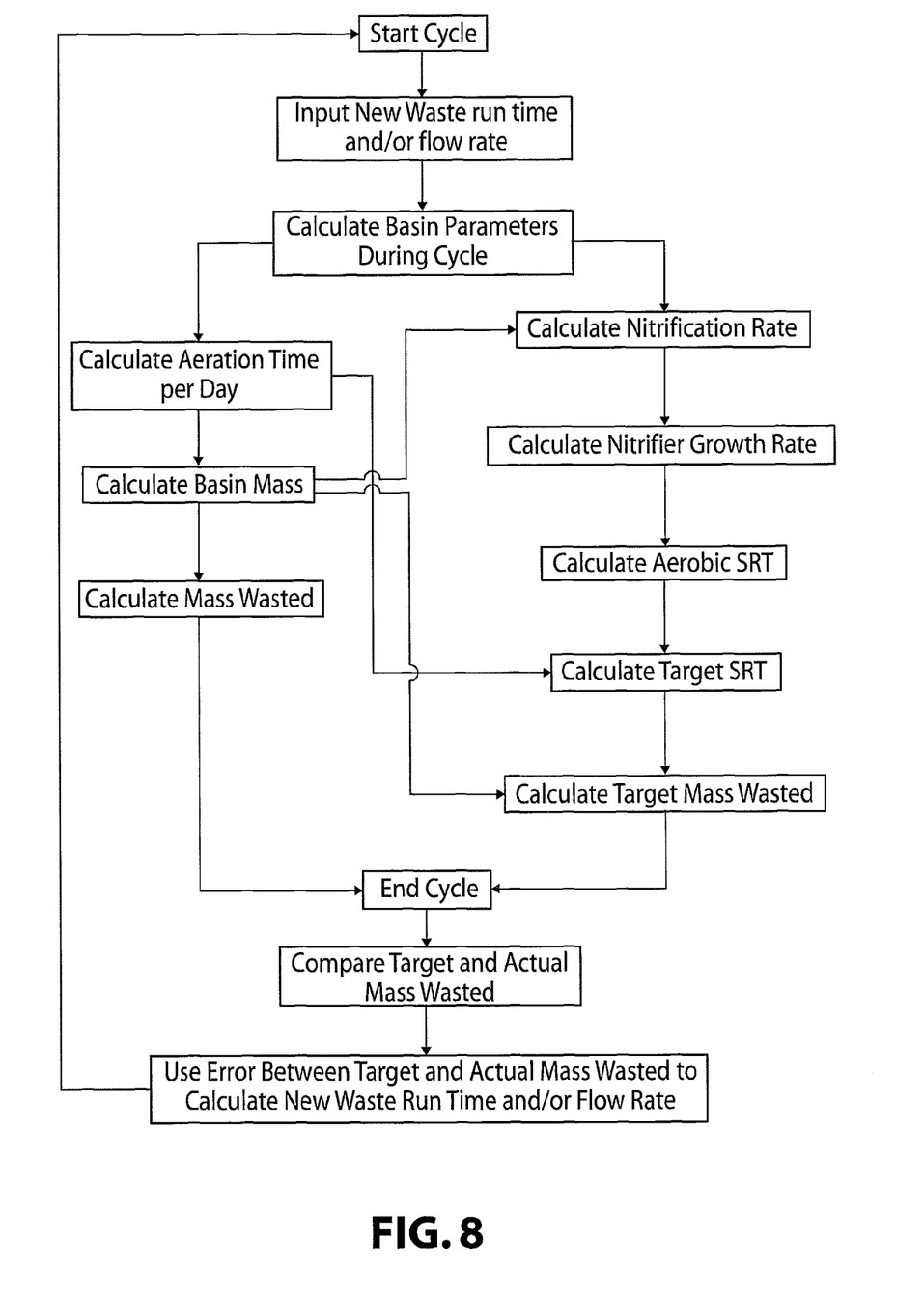
FIG. 8 is a flowchart that illustrates the logic of another embodiment of the present invention.

FIG. 8 shows the logic used to adjust the sludge age in accordance with one embodiment of the present invention and as described in detail above. As shown in FIG. 8, after the cycle is completed, a series of calculations are performed to determine the next cycles wasting time. The wasting time is determined based on the targeted SRT setpoint calculated above, using the specific nitrifier growth rate.

Figure 7:
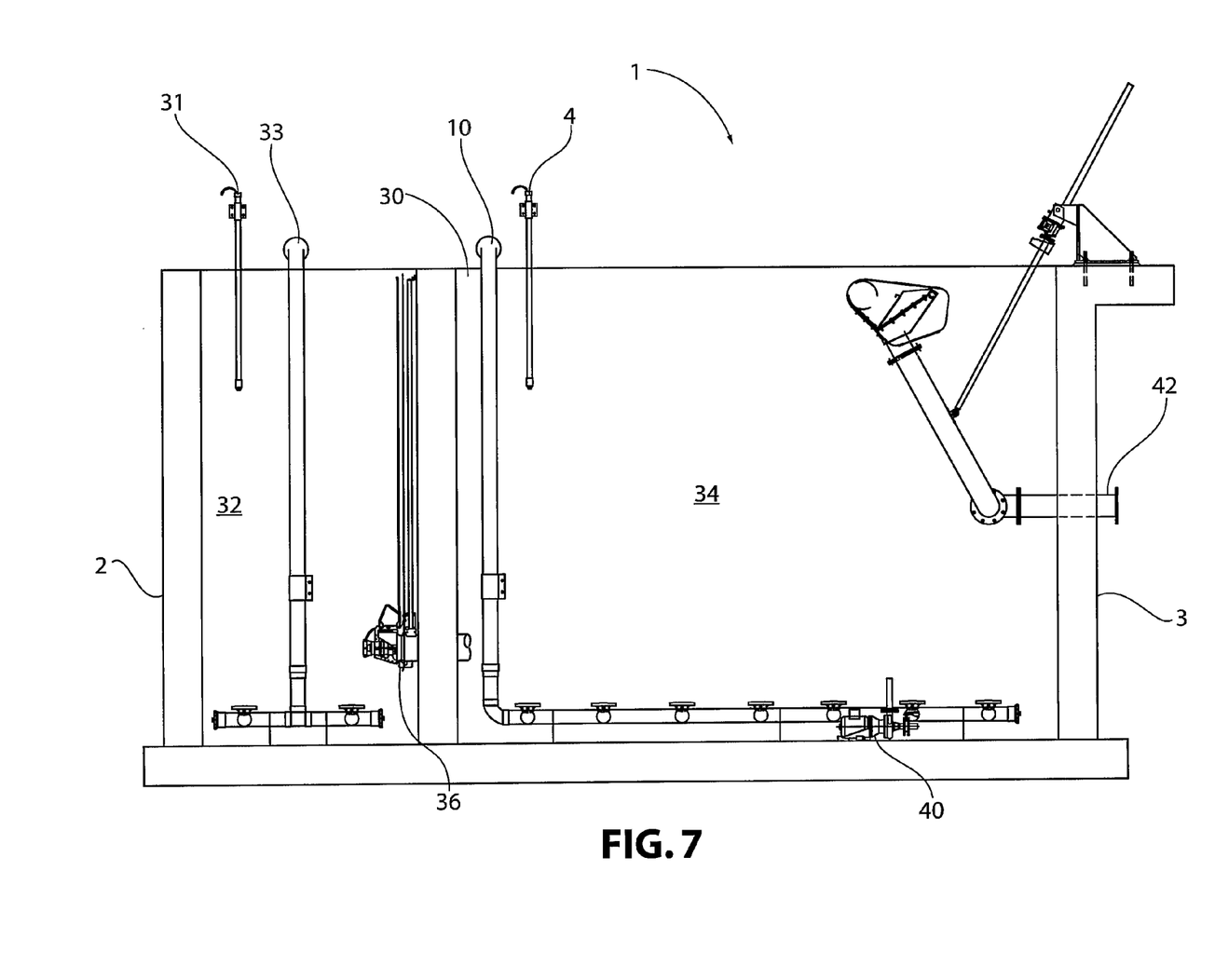
FIG. 7 is a side view of a containment device for treating wastewater having a pre-reaction wall in accordance with an embodiment of the present invention.

Referring to FIG. 7, the present invention can utilize a continuous influent flow and a pre-reaction wall 30. The pre-reaction wall 30 is located near the first end 2 of the containment device 1 where the influent wastewater enters. The area located between the first end 2 of the containment device 1 and the pre-reaction wall 30 is a pre-reaction zone 32. In this embodiment, the treatment process can be further optimized by utilizing conditions within the pre-reaction zone 32. Due to the high food to mass ratio found in pre-reaction zone 32, it is an ideal location for simultaneous nitrification and denitrification. Simultaneous nitrification and denitrification is performed in the pre-reaction zone 32 by optimizing the environment in relation to DO, ORP, $NO_2$, $NO_3$, and/or $NH_4$ concentrations. The process is controlled with aeration and/or mixing steps. A separate aeration system 33 can be used in the pre-reaction zone 32 in conjunction with an automated control valve to adjust the amount of aeration used in the pre-reaction zone 32 independent of that in the main-reaction zone 34. The control valve can be any device that is capable of adjusting the aeration system 33 between a fully opened position allowing the maximum amount of air through, a fully closed position where no air is allowed through, and any proportion between the fully opened and closed positions.

The present invention can control the aeration and/or mixing steps for the simultaneous nitrification and denitrification process by measuring the $NH_4$ and $NO_3$ in a water source and calculating their first and second order derivatives. As used herein, "first order derivative" refers to the rate of change between any two ammonium and/or nitrate measurements over a period of time. Further, as used herein, "second order derivative" refers to the variation in the rate of change between any two ammonium and/or nitrate measurements over a period of time. The change in the first and/or second order derivative can be used to enable or disable the supply of oxygen to the water source. The decrease in the second order derivative of the ammonium in the water source can be used to disable the supply of oxygen to the water source, while an increase in the second order derivative of the ammonium in the water source can be used to enable the supply of oxygen to the water source. Further, the increase in the second order derivative of the nitrate in the water source can be used to disable the supply of oxygen to the water source, while the decrease in the second order derivative of the nitrate in the water source can be used to enable the supply of oxygen to the water source. Further, the supply of oxygen can be enabled or disabled when the first order derivative of the ammonium or nitrate in the water source is equal to zero. During periods where the supply of oxygen is enabled, the amount of oxygen supplied can be varied by adjusting a control valve or the speed of a device supplying the oxygen. During periods where the supply of oxygen is disabled, the water source can be mixed where the mixing can be created by a mixer device and the speed of the mixing device can be varied.

Referring again to FIG. 7, a propeller pump 36 can be installed in the pre-reaction wall 30 to control mixing and recirculation of nitrogen and organic load between the pre-reaction zone 32 and the main-reaction zone 34. In certain embodiments, multiple propeller pumps 36 are used. By controlling the mixing and recirculation between the pre-reaction zone 32 and the main-reaction zone 34, substrate and influent load distribution can be optimized to obtain better nitrification, denitrification and biological phosphorus removal. The propeller pump 36 can operate at variable speeds, such as at 100% operation speed or it can be turned off completely for some or all of the reaction phase. In one embodiment, the propeller pump 36 is a Flygt Model 4600 series horizontal propeller pump commercially available by Xylem, Inc. The propeller pump 36 and aeration systems 10, 33 of both the pre-reaction zone 32 and the main-reaction zone 34 can be used together or separately to optimize the conditions in the containment device 1 by using COD, DO, ORP, pH, $NO_3$, $NO_2$, $NH_4$, and temperature instruments, either individually or in combination.

In addition to optimizing the aeration and mixing periods that are part of the reaction phase, the decant phase and hydraulics of the system can also be used to optimize energy efficiency while maintaining effluent quality. As used herein, "decant phase" refers to the period of time after the aerobic, anoxic and/or anaerobic phases during which the decanter or other removal mechanism 42, is activated. For systems with intermittent or continuous influent flow, predictive controls can be used to maintain the water level in the containment device 1 as high as possible for each cycle. A higher operating water level during aeration will provide higher oxygen transfer efficiency than at lower water levels. The predictive controls will include feedback from influent flow meters, sludge blanket monitors, and/or containment device 1 level transmitters to provide information such as last cycle fill rate, total volume per cycle per containment device 1, current influent flow rate, historical daily flow trends (diurnal peaks and durations), and/or sewer/pump station network. While the decant volume and duration may change from cycle to cycle, the total length of each cycle will not change, nor will the time between decants in each containment device 1 unless an independent control algorithm determines it is necessary based on an influent flow rate. As shown in FIG. 7, biomass waste is removed through a device 40 such as a pump and effluent is decanted from the containment device 1 such as through a decanter or other removal mechanism 42, separately.

In certain embodiments, the amount of water removed from a containment device 1 can be automatically controlled. To automatically control the amount of water removed from a containment device 1, the water level, water flow, sludge blanket height, or a combination thereof in a water source within a containment device 1 can be measured. The term "sludge blanket height" refers to the total height of a zone or designated space of settled solids. As noted above, such information can be measured by instruments 4 including, but not limited to, influent flow meters, sludge blanket monitors, and containment device 1 level transmitters. The hydraulic performance of a previous treatment cycle, the current treatment cycle, or a predicted future treatment cycle is also determined at the start of a decant phase of the treatment cycle in which water in the containment device 1 is being controlled. In certain embodiments, the hydraulic performance of previous treatment cycles is determined using water flow data from previous treatment cycles. In other embodiments, the hydraulic performance of previous treatment cycles is determined using treatment cycle water fill rates, total water volumes, or a combination thereof from previous treatment cycles. As used herein, the term "fill rate" refers to the change in water level over a period of time and the term "total water volume" refers to the volume of water that fills the containment device over the time period of one cycle. Further, in certain embodiments, the hydraulic performance of the current treatment cycle is determined by using current water flow data, and the hydraulic performance of the predicted future treatment cycle is determined using sewer or pump station network flow data.

After measuring certain parameters and determining the hydraulic performance, a target volume of water to be removed from the containment device 1 for a given treatment cycle can be calculated. The volume of water removed can be automatically controlled by control unit 8 by monitoring the water level in the containment device 1 or the water flow rate of the effluent B from the containment device 1. The water level in the containment device 1 is used with the known surface area of containment device 1 to determine the volume of water removed. The water flow rate of the effluent B from the containment device 1 can be totalized over a period of time during which the decanter or other removal device 42 is activated to determine the volume of water removed. Further, the removal of water from the containment device 1 is terminated once the calculated volume of water to be removed from the containment device 1 for a given treatment cycle has been achieved.

The present invention provides a wastewater treatment process that automatically treats wastewater in a containment device 1 such as a batch reactor. As explained in detail above, the process utilizes, among other things, a control algorithm to select setpoints and aerobic, anaerobic, and anoxic time duration automatically based on real-time instrumentation feedback and without operator input. The present invention is not only more efficient for operators by reducing error and time associated with setpoint input, but it is also conserves energy through the entire treatment process while optimizing effluent quality.

While various embodiments of the present invention were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

What is claimed is:

1. A method for automatically controlling solids retention time (SRT) in a water source, the method comprising:
    measuring total suspended solids, ammonium, nitrate, temperature, or a combination thereof in a water source;
    determining an amount of biomass wasted;
    calculating a nitrifier growth rate for the water source;
    calculating a target SRT for the water source using the nitrifier growth rate; and
    calculating a target amount of biomass to be wasted wherein the target amount of biomass to be wasted is automatically controlled by a control unit based on modifying a duration of wasting, a flow rate of wasting or a combination thereof.

2. The method of claim 1, wherein the amount of biomass wasted is determined using a water source flow indicator and water source total suspended solids measurements.

3. The method of claim 1, wherein the nitrifier growth rate for the water source is calculated from a nitrification rate, a nitrifier yield coefficient, the biomass in the water source, the temperature of the water source, or a combination thereof.

4. The method of claim 3, wherein the nitrification rate is determined from previously conducted water treatment cycles, from the current water treatment cycle, from an established nitrification rate, or a combination thereof.

5. The method of claim 3, wherein the nitrifier yield coefficient is selected based on established values.

6. The method of claim 1, wherein the nitrifier growth rate is calculated from the following equation (VI):

$$GR_N = NR_x \times Y_N \quad (VI)$$

where $GR_N$=nitrifier growth rate, $NR_x$=nitrification rate, and $Y_N$=nitrifier yield coefficient.

7. The method of claim 1, wherein the target SRT for the water source is calculated from the nitrifier growth rate for the water source, a safety factor, an aerobic time per day, or a combination thereof.

8. The method of claim 1, wherein the amount of biomass wasted is calculated from the following equation (VII):

$$Mass_{WAS} = \frac{Mass_{MLSS}}{SRT} \quad (VII)$$

wherein $Mass_{WAS}$=target mass to be wasted, $Mass_{MLSS}$=mass of the biomass in containment device, and SRT=target sludge retention time.

9. A method for automatically controlling the removal of water from a containment device, the method comprising:
    measuring water level, water flow, sludge blanket height, or a combination thereof in a water source within a containment device;
    determining at a start of a decant phase of a treatment cycle for the water source a hydraulic performance of a previous treatment cycle, a current treatment cycle, a predicted treatment cycle, or a combination thereof;
    calculating a volume of water to be removed from the containment device for a given treatment cycle using the hydraulic performance of previous treatment cycles, the current treatment cycle, the predicted treatment cycle, or a combination thereof;
    wherein the volume of water removed from the containment device is automatically controlled by a control unit by monitoring a water level in the containment device or a water flow rate of an effluent from the containment device; and
    terminating the removal of water from the containment device once the calculated volume of water to be removed from the containment device for a given treatment cycle has been achieved.

10. The method of claim 9, wherein the hydraulic performance of previous treatment cycles is determined using water flow data from previous treatment cycles.

11. The method of claim 9, wherein the hydraulic performance of previous treatment cycles is determined using treatment cycle water fill rates, total water volumes, or a combination thereof from previous treatment cycles.

12. The method of claim 9, wherein the hydraulic performance of the current treatment cycle is determined by using current water flow data.

13. The method of claim 9, wherein the hydraulic performance of the predicted treatment cycle is determined using sewer or pump station network flow data.

14. A method for automatically controlling biological phosphorus removal in a water source, the method comprising:
measuring a parameter selected from nitrate, phosphorus or a combination thereof in a water source;
determining a length of an anaerobic phase of a treatment cycle based on the selected parameters measured in the water source;
restricting an oxygen supply to the water source, wherein a duration of the restriction of oxygen supply is automatically controlled by a control unit based on the selected parameters measured in the water source or a predetermined time period; and
dissolving oxygen in the water source after the time period for the restriction of oxygen is determined to be completed.

15. The method of claim 14, wherein the determining of the length of the anaerobic phase of a treatment cycle comprises using a rate of change of an amount of phosphorus in the water source.

16. The method of claim 14, wherein the determining of the length of the anaerobic phase of a treatment cycle comprises using an inputted phosphorus setpoint and determining whether the amount of phosphorus in the water source exceeds the inputted phosphorus setpoint.

17. The method of claim 14, wherein the length of the anaerobic phase of a treatment cycle is determined by inputting a nitrate setpoint and an inputted anaerobic time period setpoint and determining when an amount of nitrate in the water source falls below the nitrate setpoint for the inputted anaerobic time period setpoint.

18. The method of claim 14, further comprising preventing future anaerobic phases of the treatment cycle after an initial anaerobic phase by using an inputted nitrate setpoint and determining whether a nitrate in the water source falls below the inputted nitrate setpoint.

19. The method of claim 14, wherein the predetermined time period that defines the duration of the restriction of oxygen supply is an inputted setpoint for minimum time period, maximum time period, or a combination thereof.

20. A method for automatically controlling simultaneous nitrification and denitrification in a water source, the method comprising:
measuring ammonium and nitrate in a water source;
calculating a first order derivative based on the measured ammonium and nitrate in the water source;
calculating a second order derivative based on the measured ammonium and nitrate in the water source; and
using the first order derivative, second order derivative, or combination thereof to enable and disable a supply of oxygen to the water source,
wherein the oxygen supply is automatically controlled by a control unit.

21. The method of claim 20, further comprising using a decrease in the second order derivative of the ammonium in the water source to disable the supply of oxygen to the water source and an increase in the second order derivative of the ammonium in the water source to enable the supply of oxygen to the water source.

22. The method of claim 20, further comprising using a decrease in the second order derivative of the nitrate in the water source to enable the supply of oxygen to the water source and an increase in the second order derivative of the nitrate in the water source to disable the supply of oxygen to the water source.

23. The method of claim 20, wherein the supply of oxygen to the water source is enabled or disabled when the first order derivative of the ammonium or nitrate measured in the water source is equal to zero.

24. The method of claim 20, further comprising mixing the water source when the oxygen supply is disabled.

25. The method of claim 20, further comprising varying an amount of oxygen supplied to the water source when the supply of oxygen is enabled.

* * * * *